United States Patent
Martin et al.

(10) Patent No.: US 12,546,336 B2
(45) Date of Patent: Feb. 10, 2026

(54) TREATMENT OF NON-AXISYMMETRIC CASING WITH CONTROLLED OPENING

(71) Applicant: SAFRAN, Paris (FR)

(72) Inventors: Simon Pierre Michel Martin, Moissy-Cramayel (FR); Gabriel Perez, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 19/117,504

(22) PCT Filed: Sep. 28, 2023

(86) PCT No.: PCT/FR2023/051501
§ 371 (c)(1),
(2) Date: Apr. 1, 2025

(87) PCT Pub. No.: WO2024/074777
PCT Pub. Date: Apr. 11, 2024

(65) Prior Publication Data
US 2026/0009403 A1    Jan. 8, 2026

(30) Foreign Application Priority Data
Oct. 4, 2022   (FR) ....................... 2210149

(51) Int. Cl.
*F04D 29/56* (2006.01)
*F01D 17/14* (2006.01)
(Continued)

(52) U.S. Cl.
CPC ......... *F04D 29/563* (2013.01); *F01D 17/141* (2013.01); *F04D 25/06* (2013.01);
(Continued)

(58) Field of Classification Search
CPC .... F04D 29/524; F04D 29/526; F04D 29/545; F04D 29/563; F01D 17/141
See application file for complete search history.

(56) References Cited

U.S. PATENT DOCUMENTS 5,694,767 A * 12/1997 Vdoviak ................... F02K 3/10
60/226.3
7,581,382 B2 * 9/2009 Sadil ......................... F02C 7/12
60/776
(Continued)

FOREIGN PATENT DOCUMENTS

| | | |
|---|---|---|
| EP | 4119802 A1 | 1/2023 |
| FR | 2989742 A1 | 10/2013 |
| GB | 2408546 A | 6/2005 |

OTHER PUBLICATIONS

Search Report and Written Opinion issued in International Application No. PCT/FR2023/051501, mailed Jan. 16, 2024.

*Primary Examiner* — Christopher S Bobish
(74) *Attorney, Agent, or Firm* — Bookoff McAndrews, PLLC

(57) ABSTRACT

Casing of a gas turbine engine compressor comprising openings cut in the thickness of the casing from an inner surface of the casing and arranged side by side over a circumference of the casing, characterised in that it also comprises a movable ring, formed by at least two annular portions, positioned on an outer surface of the casing opposite the openings and able to move along the circumference of the casing such as to open and close the openings of the casing to activate or deactivate a casing treatment, the movable ring comprising the same number of slots as there are openings in the casing.

8 Claims, 4 Drawing Sheets

(51) Int. Cl.
    *F04D 25/06*    (2006.01)
    *F04D 29/52*    (2006.01)
    *F04D 29/54*    (2006.01)

(52) U.S. Cl.
    CPC ......... *F04D 29/524* (2013.01); *F04D 29/526* (2013.01); *F04D 29/545* (2013.01)

(56) References Cited

U.S. PATENT DOCUMENTS

| | | | |
|---|---|---|---|
| 11,346,240 B2 * | 5/2022 | Little | F01D 17/141 |
| 12,018,621 B1 * | 6/2024 | Heeter | F02C 7/042 |
| 12,078,070 B1 * | 9/2024 | Heeter | F01D 17/14 |
| 12,085,021 B1 * | 9/2024 | Heeter | F02K 3/06 |
| 2003/0002982 A1 * | 1/2003 | Irie | F04D 15/0027 |
| | | | 415/220 |
| 2008/0044273 A1 | 2/2008 | Khalid | |
| 2015/0027130 A1 * | 1/2015 | LeBlanc | F02C 9/18 |
| | | | 60/785 |
| 2016/0010652 A1 * | 1/2016 | Lim | F04D 27/002 |
| | | | 415/128 |
| 2016/0153465 A1 | 6/2016 | Yoon et al. | |
| 2016/0238012 A1 * | 8/2016 | Nejedly | F04D 29/4213 |
| 2020/0386115 A1 * | 12/2020 | Little | F01D 17/141 |

\* cited by examiner

[Fig. 1]
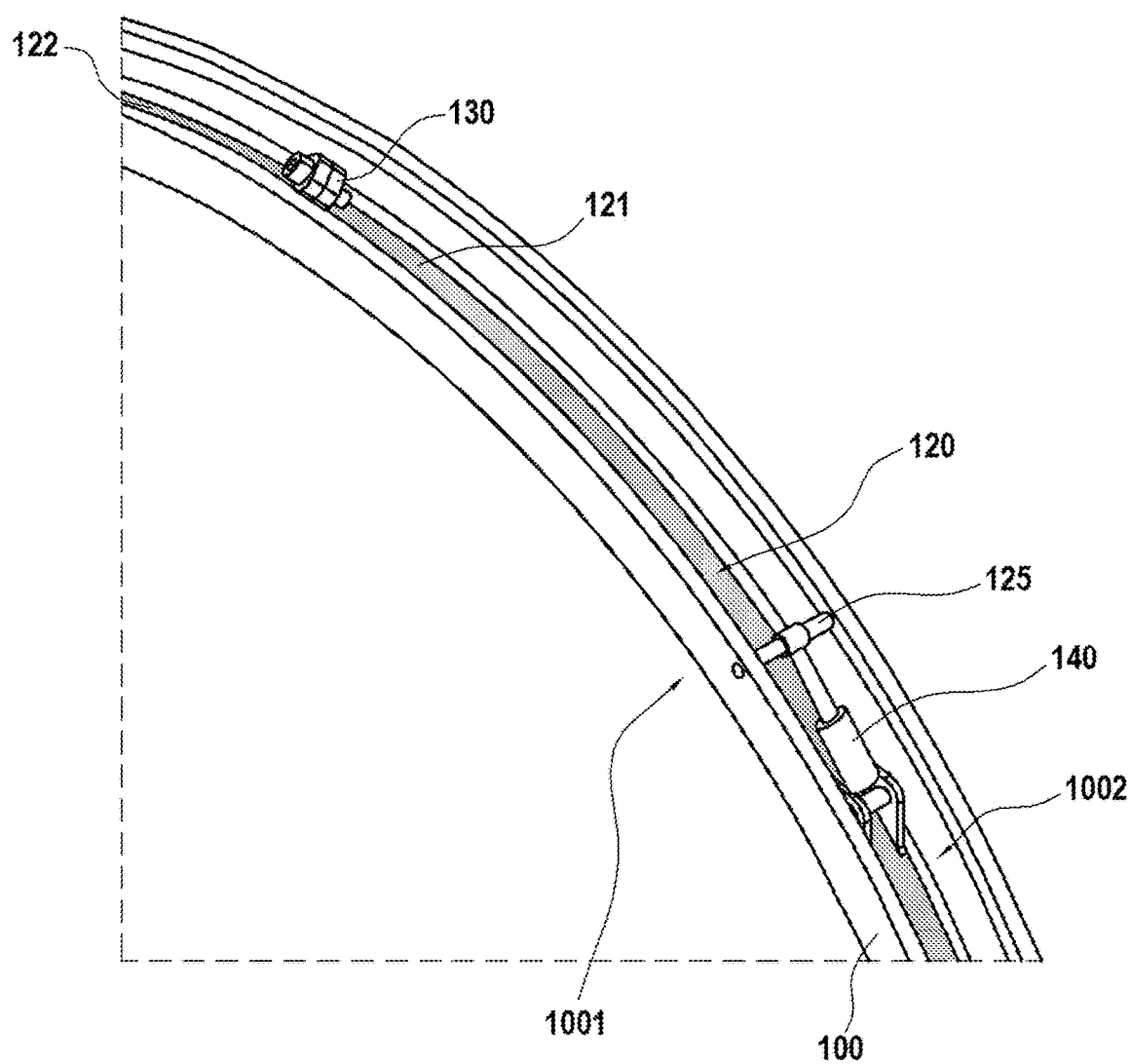

[Fig. 2A]
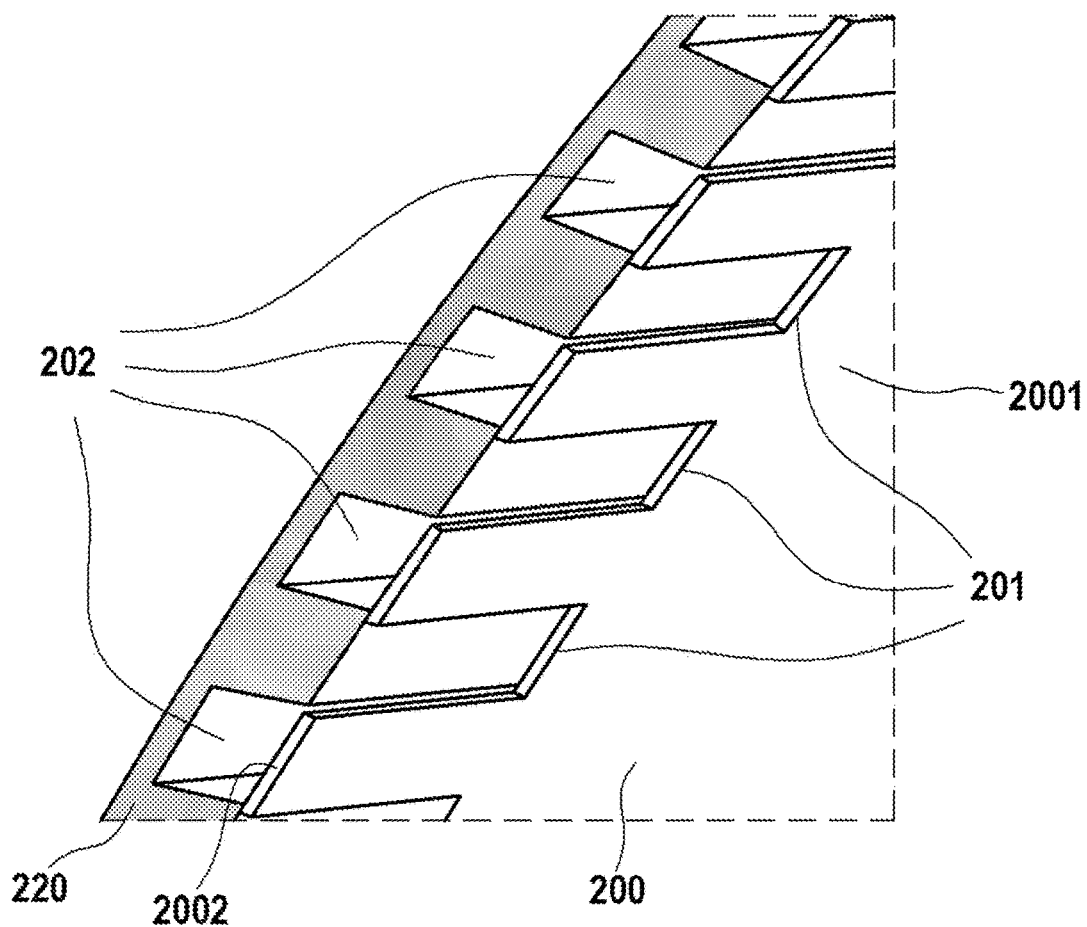

[Fig. 2B]
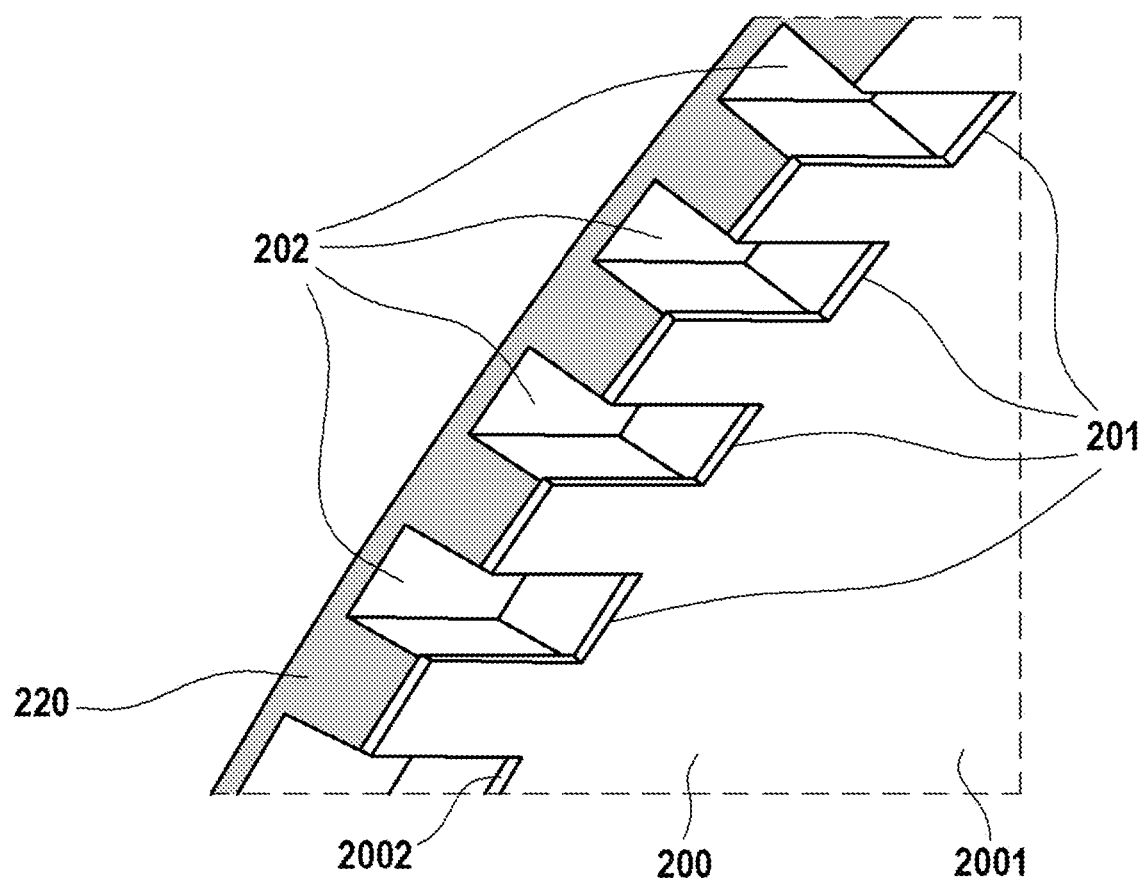

[Fig. 3]
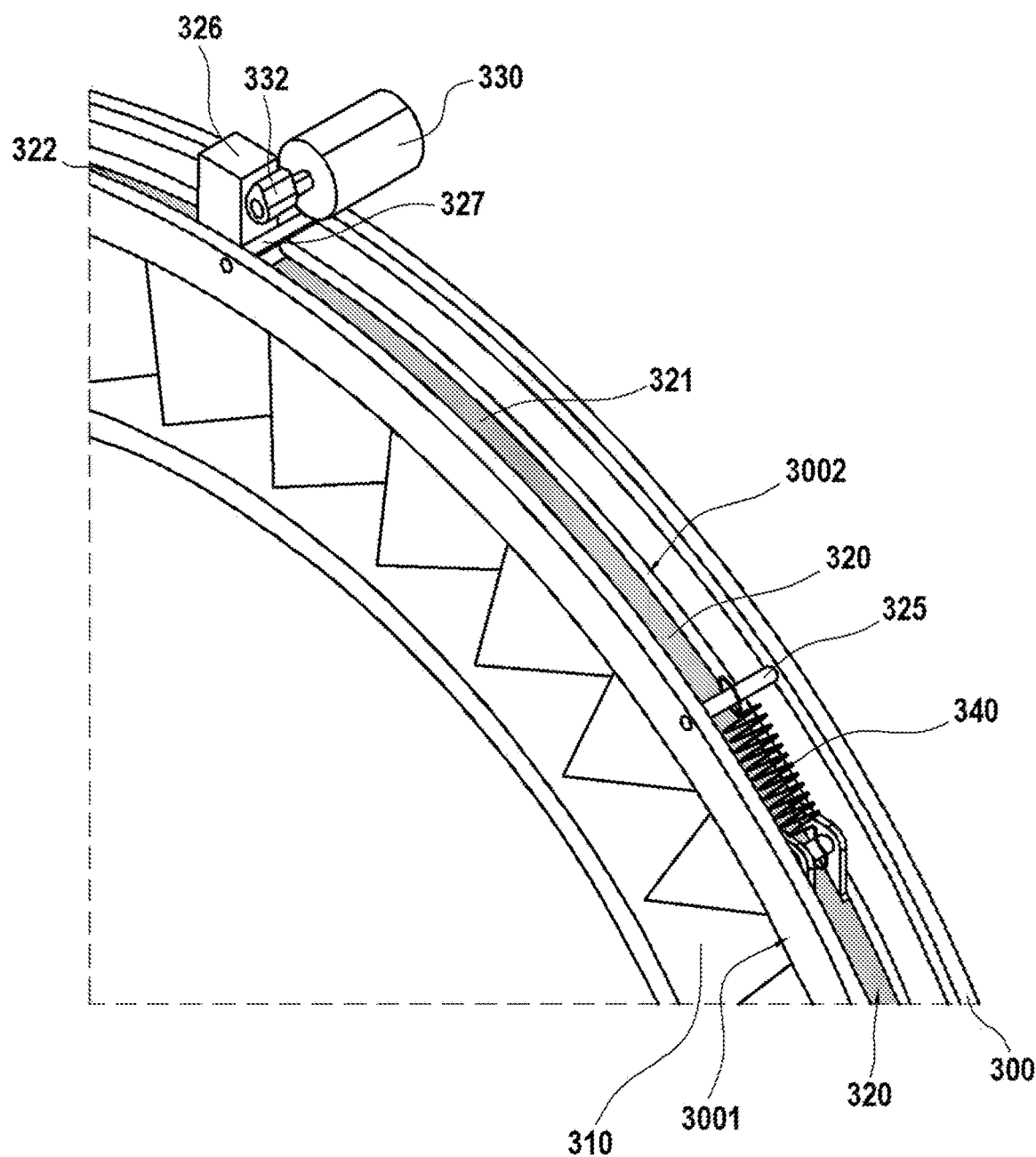

TREATMENT OF NON-AXISYMMETRIC CASING WITH CONTROLLED OPENING

CROSS-REFERENCE TO RELATED APPLICATIONS

This is a National Stage Application under 35 U.S.C. § 371 of International Application No. PCT/FR2023/051501, filed Sep. 28, 2023, now published WO 2024/074777 A1, which claims priority to French Patent Application No. 2210149, filed on Oct. 4, 2022, the entireties of which are incorporated herein by reference.

TECHNICAL FIELD

The present disclosure relates to the general field of compressors in gas turbine engines, and more particularly to treatment of the compressor casing of a gas turbine engine.

PRIOR ART

Gas turbine engine compressors are composed of blades set in rotation inside a casing which seals the airflow from the outer surround of the engine.

It is known that the clearance existing between the tips of the mobile compressor blades and the casing forming the inner wall of the airflow degrades the efficiency of the gas turbine engine.

In addition, this clearance can modify and degrade the operation of the compressor up until the onset of a phenomenon known as compressor stall resulting from disruption of airflow on the surface of the blades. Control over the circulation of air at the tips of the blades amounts to a major challenge for the obtaining both of good aerodynamic efficiency of the compressor and a sufficient margin against the phenomenon of compressor stall.

To limit the impact of this parasitic flow between the tips of the blades and the casing, the inner surface of the casing can be locally treated by cutting out recesses therein arranged in the thickness of the casing opposite the blades. Documents FR 2 989 742, GB 2 408 546 and US 2016/153465 provide examples of casing treatment.

Nevertheless, the phenomenon of compressor stall only occurs when the compressor is under a high load i.e. when it operates in the top part of its operating range. Outside this zone, casing treatments are therefore no longer useful and even responsible for loss of efficiency of the compressor.

It is therefore desirable to provide a compressor casing wherein it is possible to open or close the slots of the casing treatment, to prevent the stall phenomenon whilst maintaining good compressor efficiency.

DISCLOSURE OF THE INVENTION

The invention relates to a casing of a gas turbine engine compressor comprising openings cut in the thickness of the casing from an inner surface of the casing and arranged side by side over a circumference of the casing, characterised in that it also comprises a movable ring formed by at least two annular portions positioned on an outer surface of the casing opposite the openings and able to move along the circumference of the casing such as to close or open the openings of the casing to activate or deactivate a casing treatment, the movable ring comprising the same number of slots as there are openings in the casing.

When the openings in the casing are aligned with the slots of the movable ring i.e. when the casing openings lie opposite the slots of the movable ring, the openings on the casing form the slots of a non-axisymmetric casing treatment since they are present along the circumference of the casing and opened onto the airflow. In other words, they form axial slots arranged in azimuth direction and are therefore non-axisymmetric relative to the rotation axis of the compressor, whereas axisymmetric casing treatments are composed of circumferential grooves and are symmetrical in relation to the rotation axis of the compressor.

With the invention, it is possible to open or close the slots of the casing treatment by means of the movable ring. This makes it possible to obtain an active casing treatment when operating conditions so require e.g. on take-off to prevent the stall phenomenon, and to obtain an inactive casing treatment when the compressor is no longer under load e.g. at cruising speed, to give priority to compressor efficiency. The invention therefore provides control over the opening of the casing treatment.

According to one particular characteristic of the invention, each opening of the casing has a width greater than or equal to the width of the associated slot of the movable ring, and each opening of the casing has a length greater than or equal to the length of the associated slot of the movable ring.

According to another particular characteristic of the invention, the casing also comprises at least one spring assembling the movable ring onto the casing and configured so that the openings of the casing are open when the spring is unstressed.

The spring allows the movable ring to be returned to an initial position or to a safety position wherein the ring slots lie opposite the openings of the casing, such that the slots of the casing treatment are fully open to obtain an active casing treatment.

According to another particular characteristic of the invention, the casing comprises an electric motor comprising a camshaft, the cam being configured to move the movable ring along the circumference of the casing to open or close the casing openings. I The camshaft allows movement of the movable ring along the circumference of the casing, and more particularly the cam allows the movable ring to be moved over an amplitude at least equal to the width of an opening of the casing, to obtain full opening or closing of the casing openings, and therefore to obtain full opening or closing of the slots of the casing treatment.

According to another particular characteristic of the invention, the casing comprises an actuator configured to move the movable ring along the circumference of the casing, to open or close the casing openings.

The actuator can play the same role as the camshaft and therefore allows the movable ring to be moved along the circumference of the casing to close or open the slots of the casing treatment. It therefore allows the movable ring to be moved over an amplitude at least equal to the width of a casing opening.

According to another particular characteristic of the invention, the dimensions of the slots of the movable ring and of the casing openings are the same.

This means that the slots of the movable ring and the casing openings have the same length and same width. This facilitates the opening and closing of the slots of the casing treatment since, by moving the movable ring over the width of a casing opening, it is possible to obtain full opening or closing of the corresponding slot of the casing treatment.

According to another particular characteristic of the invention, the number of openings in the casing is between 40 and 850.

According to another particular characteristic of the invention, the movable ring and the casing are made of one same material.

BRIEF DESCRIPTION OF THE DRAWINGS

Other characteristics and advantages of the present invention will become apparent from the description given below, with reference to the appended drawings illustrating examples of embodiment that are not in any way limiting.

FIG. 1 is a partial schematic illustration of a casing of a gas turbine engine compressor according to one embodiment of the invention.

FIG. 2A is a partial schematic illustration of the closed slots of the compressor casing treatment in FIG. 1.

FIG. 2B is a partial schematic illustration of the open slots of the compressor casing treatment in FIG. 1.

FIG. 3 is a partial schematic illustration of a casing of a gas turbine engine compressor according to another embodiment of the invention.

DESCRIPTION OF EMBODIMENTS

FIG. 1 partially and schematically illustrates a casing 100 of a gas turbine engine compressor according to a first embodiment of the invention.

The casing 100 comprises openings hollowed (or cut out) in the thickness of the casing from the inner surface 1001 of the casing 100. The openings are arranged side by side over the circumference of the casing 100.

The casing 100 also comprises a movable ring 120 on the outer surface 1002 of the casing 100. The movable ring 120 comprises as many slots as there are openings in the casing 100, and is able to move along the circumference of the casing 100 to open or close the openings of the casing 100 via the ring slots. By means of the alignment of the slots of the movable ring 120 with the openings of the casing 100, i.e. when the slots of the movable ring 120 lie opposite the openings of the casing 100, a casing treatment is formed having slots that are open when the openings of the casing 100 are open. In other words, the movable ring 120 rotates around the casing 100 to close or open the openings of the casing 100.

Each opening of the casing 100 has a width greater than or equal to the width of the associated slot of the movable ring 120 (or the slot facing said opening), and each opening of the casing 100 has a length greater than or equal to the length of the associated slot of the movable ring 120 (or slot facing said opening). This guarantees that the openings of the casing 100 are fully open when it is desired to activate the casing treatment.

Additionally, the distance between each opening of the casing 100 is greater than or equal to the width of the associated slot of the movable ring 120. This guarantees that the openings of the casing 100 are fully closed when it is desired to deactivate the casing treatment.

The movable ring 120 is formed of two annular portions 121 and 122. In this first embodiment, the two annular portions 121 and 122 are assembled together via a self-drilling screw 130, but they can instead be assembled by any another assembling means e.g. a system composed of a guide pin, and a screw and nut assembly for holding in position.

By having a movable ring 120 formed of at least two annular portions 121 and 122, this facilitates mounting of the movable ring 120 on the casing 100.

The casing 100 comprises a piston 140 secured at one of its ends to the movable ring 120 and at the other end to the casing 100 via a tie rod 125. The piston 140 provides control over the movement of the movable ring 120 along the circumference of the casing 100 for movement thereof over an amplitude at least equal to the width of the openings of the casing 100 to fully close and/or fully open the openings of the casing 100 and hence the slots of the casing treatment. The tie rod 125 allows rigidification of the casing 100 and provides a fixed point for securing of the piston 140.

To move the movable ring 120 on the casing 100, the piston 140 can be replaced by an actuator.

FIGS. 2A and 2B illustrate a cross-sectional view of the openings 201 when open (FIG. 2B) or closed (FIG. 2A) of the casing 200 in FIG. 1, obtained by movement of the movable ring 200 and by means of the slots 202 thereof. As indicated with reference to FIG. 1, the openings 201 of the casing 200 are hollowed (or cut out) in the thickness of the casing 200 from the inner surface 2001 thereof and are arranged side by side over the circumference of the casing 200. The movable ring 220 comprises the same number of slots 202 as there are openings 201 in the casing 200, and it is positioned on the outer surface 2002 of the casing 200 such that it is able to close or open the openings 201 of the casing 200 by moving around the circumference of the casing 200. In this example of embodiment, the slots 202 of the movable ring 220 have the same width and length as the openings 201 of the casing 200. In addition, the distance between the openings 201 of the casing 200 is the same as the distance between the slots 202 of the movable ring 220. Therefore, when the slots 202 of the movable ring 220 coincide with the openings 201 of the casing 200, the openings 201 of the casing 200 are fully open (FIG. 2B) and the slots of the casing treatment are open. When the slots 202 of the movable ring 220 cover the openings 201 of the casing 200, the openings 201 of the casing 200 are fully closed and the slots of the casing treatment are closed (FIG. 2A). The casing treatment 200 is therefore inactive in the case shown in FIG. 2A (slots of the casing treatment closed), and it is active in the case shown in FIG. 2B (slots of the casing treatment open).

FIG. 3 partially and schematically illustrates a casing 300 of a gas turbine engine compressor 310 according to a second embodiment of the invention.

As indicated with reference to FIG. 1, the casing 300 comprises openings hollowed or cut out in the thickness of the casing 300 from the inner surface 3001 of the casing 300. The openings are arranged side by side along the circumference of the casing 300.

The casing 300 also comprises a movable ring 320 on the outer surface 3002 of the casing 300. The movable ring 320 comprises the same number of slots as there are openings in the casing 300, and it is able to move around the circumference of the casing 300 to open or close the openings of the casing 300 using its own slots to open or close the slots of the casing treatment. As indicated with reference to FIG. 1, each opening of the casing 300 has a width greater than or equal to the width of the associated slot of the movable ring 320, and each opening of the casing 300 has a length greater than or equal to the length of the associated slot of the movable ring 320. In addition, the distance between each opening of the casing 300 is greater than or equal to the width of the associated slot of the movable ring 320.

The movable ring 320 is formed of two annular portions 321 and 322. As previously indicated, the two annular portions 321 and 322 can be assembled together via a self-drilling screw or any other assembling means.

To move the movable ring 320 and to close or open the slots of the casing treatment, and hence the openings of the casing 300, the casing 300 comprises an electric motor 330 comprising a camshaft 332. By pivoting, the cam 332 allows the movable ring 320 to be moved along the circumference of the casing 300. The cam 332 is able to bear upon a projecting portion 326 on one of the annular portions 322 so that it can pivot and move the movable ring 320. The electric motor 330 and the camshaft 332 allow movement of the movable ring 320 over an amplitude at least equal to the width of an opening of the casing 300. A tie rod 327 can be used to block the projecting portion 326 when the movable ring 320 is in movement.

The casing 300 may also comprise a spring 340 secured to the movable ring 320 and to the casing 300 via a tie rod 325. This spring 340 is configured so that, when it is unstressed, the openings of the casing 300 are open i.e. so that the slots of the movable ring 320 do not shut off the openings of the casing 300 (the case in FIG. 2B) and the casing treatment is active. As previously, the tie rod 325 also allows rigidification of the casing 300 in addition to forming a fixed point for securing of the spring 340.

Irrespective of embodiment, the openings of the casing can all be identical.

Irrespective of embodiment, the slots of the movable ring can all be identical. Advantageously, the slots of the movable ring and the openings of the casing have the same dimensions i.e. they have the same length and the same width; and the distance between the openings of the casing is equal to the distance between the associated slots of the movable ring. It is thereby possible to obtain slots of the movable ring which coincide with the openings of the casing, and only to move the movable ring over the amplitude of the slots thereof so that it can fully open or fully close the openings of the casing, and hence also the slots of the casing treatment.

Irrespective of embodiment, the casing can be of monobloc structure.

Irrespective of embodiment, the number of openings in the casing (and therefore of the movable ring) is between 40 and 850, for example between 45 and 810, for example between 60 and 210. The casing treatment requires between 3 and 8 slots per rotor blade, and a rotor comprises between 15 and 90 blades. With this range of values, it is therefore possible to cover all possibilities.

Irrespective of embodiment, the casing and the movable ring can be made of the same material. This enables the two parts to undergo the same heat and mechanical stresses, thereby ensuring that the opening or closing of the casing treatment will always be possible even in the event of thermal expansion.

Alternatively, the casing and movable ring can be made of different materials, but these two materials must have close, even identical physical properties so that they have similar thermal expansion.

The expression «between . . . and . . .» is to be construed as including the limits.

The invention claimed is:

1. A casing of a gas turbine engine compressor comprising openings cut in the thickness of the casing from an inner surface of the casing and arranged side by side over a circumference of the casing, characterised in that it also comprises a movable ring, formed by at least two annular portions, positioned on an outer surface of the casing opposite the openings and able to move along the circumference of the casing such as to open or close the openings of the casing to activate or deactivate a casing treatment, the movable ring comprising the same number of slots as there are openings in the casing.

2. The compressor casing according to claim 1, wherein each opening of the casing has a width greater than or equal to the width of the associated slot of the movable ring, and each opening of the casing has a length greater than or equal to the length of the associated slot of the movable ring.

3. The compressor casing according to claim 1, also comprising at least one spring assembling the movable ring onto the casing, configured so that the openings of the casing are open when the spring is unstressed.

4. The compressor casing according to claim 1, comprising an electric motor comprising a camshaft, the cam being configured to move the movable ring along the circumference of the casing such that it opens or closes the openings of the casing.

5. The compressor casing according to claim 1, comprising an actuator configured to move the movable ring along the circumference of the casing such as to open or close the openings of the casing.

6. The compressor casing according to claim 1, wherein the dimensions of the slots of the movable ring and of the openings of the casing are the same.

7. The compressor casing according to claim 1, wherein the number of openings in the casing is between 40 and 850.

8. The compressor casing according to claim 1, wherein the movable ring and the casing are made of one same material.

* * * * *